(12) United States Patent
Höck et al.

(10) Patent No.: US 6,851,534 B2
(45) Date of Patent: Feb. 8, 2005

(54) AXIAL SETTING DEVICE WITH A SWITCHING COUPLING INCORPORATED INTO THE DRIVE

(75) Inventors: Michael Höck, Neunkirchen-Seelscheid (DE); Klaus Mätzschker, Neunkirchen (DE)

(73) Assignee: GKN Automotive GmbH (DE)

(*) Notice: Subject to any disclaimer, the term of this patent is extended or adjusted under 35 U.S.C. 154(b) by 161 days.

(21) Appl. No.: 10/273,087

(22) Filed: Oct. 17, 2002

(65) Prior Publication Data

US 2003/0089185 A1 May 15, 2003

(30) Foreign Application Priority Data

Oct. 20, 2001 (DE) .......................................... 101 51 960

(51) Int. Cl.⁷ .............................................. F16D 13/04
(52) U.S. Cl. ..................... 192/35; 192/84.7; 192/48.2
(58) Field of Search ......................... 192/84.7, 35, 48.2

(56) References Cited

U.S. PATENT DOCUMENTS

| | | | |
|---|---|---|---|
| 5,620,072 A | * | 4/1997 | Engle .......................... 192/35 |
| 5,713,445 A | * | 2/1998 | Davis et al. ................... 192/35 |
| 5,810,141 A | * | 9/1998 | Organek et al. ............... 192/35 |
| RE36,502 E | * | 1/2000 | Organek et al. ............... 192/35 |
| 6,302,251 B1 | * | 10/2001 | Fair et al. ..................... 192/35 |
| 6,666,315 B2 | * | 12/2003 | Organek et al. ............ 192/84.7 |
| 6,691,845 B2 | * | 2/2004 | Showalter ..................... 192/35 |

FOREIGN PATENT DOCUMENTS

| | | |
|---|---|---|
| AT | 004 939 U1 | 1/2002 |
| DE | 38 15 225 C2 | 11/1989 |
| DE | 39 09 112 C2 | 9/1990 |

\* cited by examiner

*Primary Examiner*—David M. Fenstermacher

(57) ABSTRACT

An axial setting device comprising two plates (24, 29) which are relatively rotatable and coaxially supported relative to one another and between which balls are guided in pairs of ball grooves (34, 39) in the plates (24, 29), with the depth of said pairs of ball grooves (34, 39) being circumferentially variable; of the plates (24, 29), one is axially supported and one is axially displaceable against the elastic returning forces of spring means; at least one of the plates (24, 29) is drivable via a driveline by a driving motor (11). Within the driveline, between the driving motor (11) and the drivable plates (24, 29), there is inserted a switching coupling (83).

12 Claims, 6 Drawing Sheets

AXIAL SETTING DEVICE WITH A SWITCHING COUPLING INCORPORATED INTO THE DRIVE

TECHNICAL FIELD

The invention relates to an axial setting device comprising two plates which are relatively rotatable and coaxially supported relative to one another and between which balls are guided in pairs of ball grooves in the plates, with the depth of the pairs of ball grooves being circumferentially variable. One of the plates is axially supported and one is axially displaceable against elastic returning forces of a spring mechanism. At least one of the plates is drivable via a driveline by a driving motor.

BACKGROUND OF THE INVENTION

One rotatingly driven plate can, at the same time, constitute the axially displaceable one, but this would be an exception. Normally, the supported plate is rotatingly driven and the axially displaceable plate which, in turn, is supported via the balls on the supported plate is held in a rotationally fast way.

For actuating the axial setting device, the driving motor is driven in a first direction of rotation. The at least one plate coupled to the driving motor via reduction stages of the driveline is rotated, and the displaceable plate, which, in turn, axially supports itself on the axially supported plate is axially displaced against elastic returning forces of the spring mechanism.

The balls which, in pairs of ball grooves, rest against end stops and which, at the same time, are positioned there in the deepest groove portions are caused, by the relative rotation of the plates relative to one another, to move towards flatter groove portions, as a result of which the plates push each other away from one another.

If the driving motor is driven in the opposite direction or de-energised, the elastic returning force of the spring mechanism acting on the displaceable plate causes the latter to be pushed back and the at least one rotatingly drivable plate is rotated backwards, either actively by the driving motor or due to the effect of the spring mechanism by way of the balls in the ball grooves until the balls in their pairs of ball grooves simultaneously abut the end stops. As a result of the balls abutting the ends of the ball grooves, the rotating masses of this system, i.e. the rotatable one of the plates, the gears of the driveline and the motor shaft of the driving motor with the rotor mass are stopped abruptly.

The elastic deformation of the motor shaft caused by stopping the rotating masses so abruptly can lead to tooth fracture at the pinion or at the gear set because the force impact points in the toothings move outwards due to the bending of the motor shaft, as a result of which the pinion or the gear set are subjected to loads which can exceed the design loads.

SUMMARY OF THE INVENTION

It is therefore an object of the present invention to provide a design which is capable of accommodating in a damage-free way the momentum generated as a result of the rotating masses being braked when the balls abut the ends of the ball grooves. The objective is achieved in that the present invention provides a switching coupling inserted between the driving motor and the drivable one of the plates.

The switching coupling of the present invention ensures that at least the motor shaft with the rotor mass, and possibly also further masses of the driveline, are disconnected from the abutting drivable plate in the sense that the de-energised motor or, optionally, the electrically braked motor can continue to rotate without there being mechanical overloads. In this context, it should be taken into account that, as a rule, the object is to achieve the quickest possible return movement, irrespective of whether such a return movement is effected actively by the driving motor or, if the driving motor is de-energized, merely by the returning force of the spring mechanism and by the ramp effect of the ball grooves.

According to a first embodiment, the switching coupling is effectively incorporated between a motor shaft of the driving motor and a coupling shaft. According to a second embodiment, the switching coupling is effectively inserted between two gearwheels of an intermediate shaft of the driveline, of which one is connected to the intermediate shaft in a rotationally fast way, with the other one being rotatably supported on the intermediate shaft. According to a third embodiment, the switching coupling is inserted between the drivable one of the plates and a gearwheel or tooth segment serving for driving the drivable one of the plates. The reduction in the masses to be braked and thus in the momentum when the balls abut the groove ends becomes more effective from embodiment to embodiment.

According to a first method according to the present invention for returning purposes, the driving motor, from the start, is disconnected from the device by the switching coupling in accordance with the invention. The rotatable plate is turned back from the axially displaceable plate by the above-mentioned functions of the spring mechanism and ball grooves. When the rotatable plate abuts, the disconnected motor shaft with the rotor mass can continue to rotate freely, and the way in which the motor shaft is eventually braked is not significant. The motor shaft is kept completely free from the delaying momentum of the rotatingly drivable plate.

According to a second method, the device is actively returned by the driving motor, in which case the axially displaceable plate only axially follows the rotatingly driven plate. When the stops are reached and when the rotatingly drivable plate is stopped, the motor shaft with the rotor mass and, optionally, further parts of rotational masses of the driveline can simultaneously be disconnected by the inventive switching coupling.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
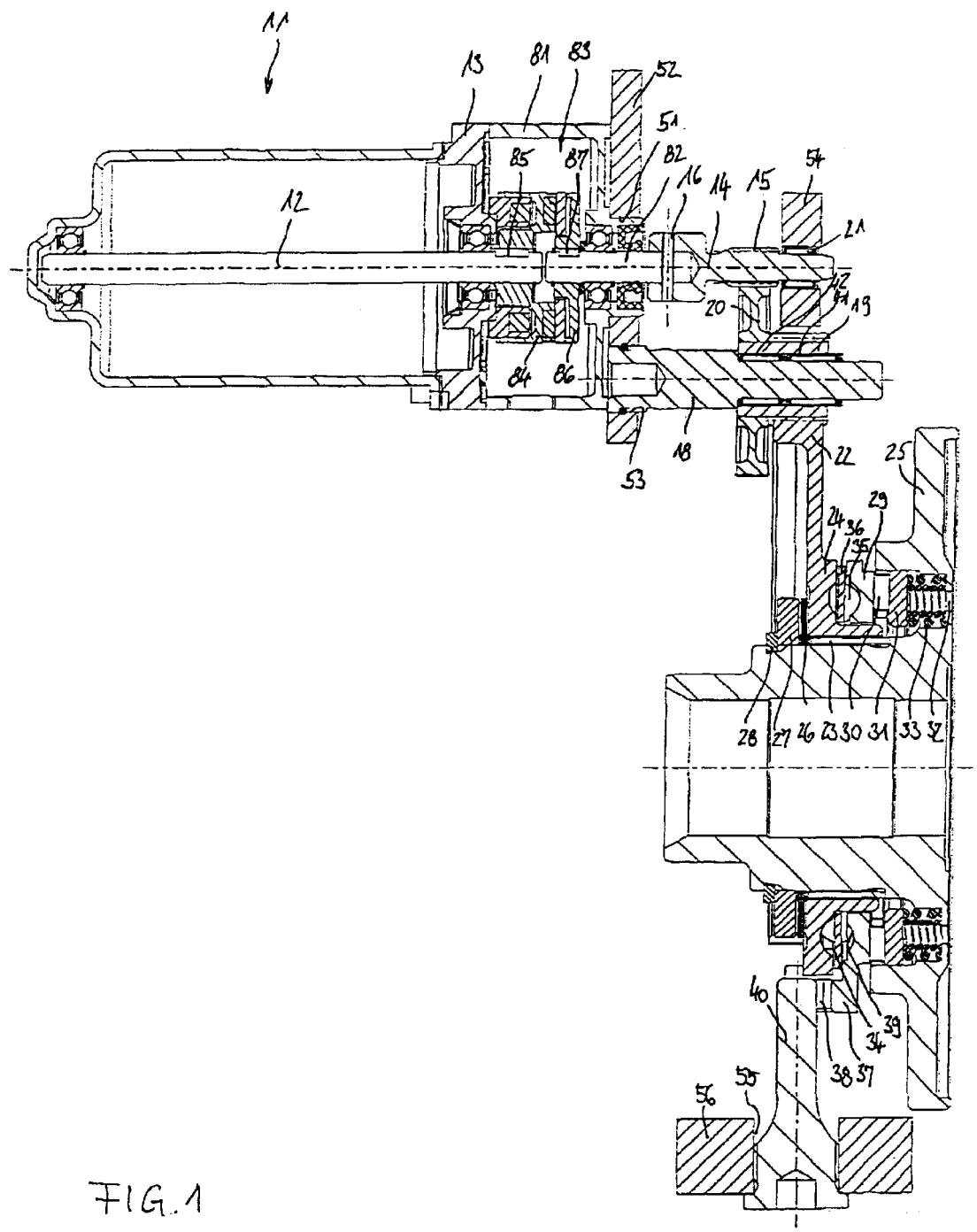
FIG. 1 shows an inventive device in a first embodiment with a switching coupling arranged on the shaft of the driving motor.
Figure 2:
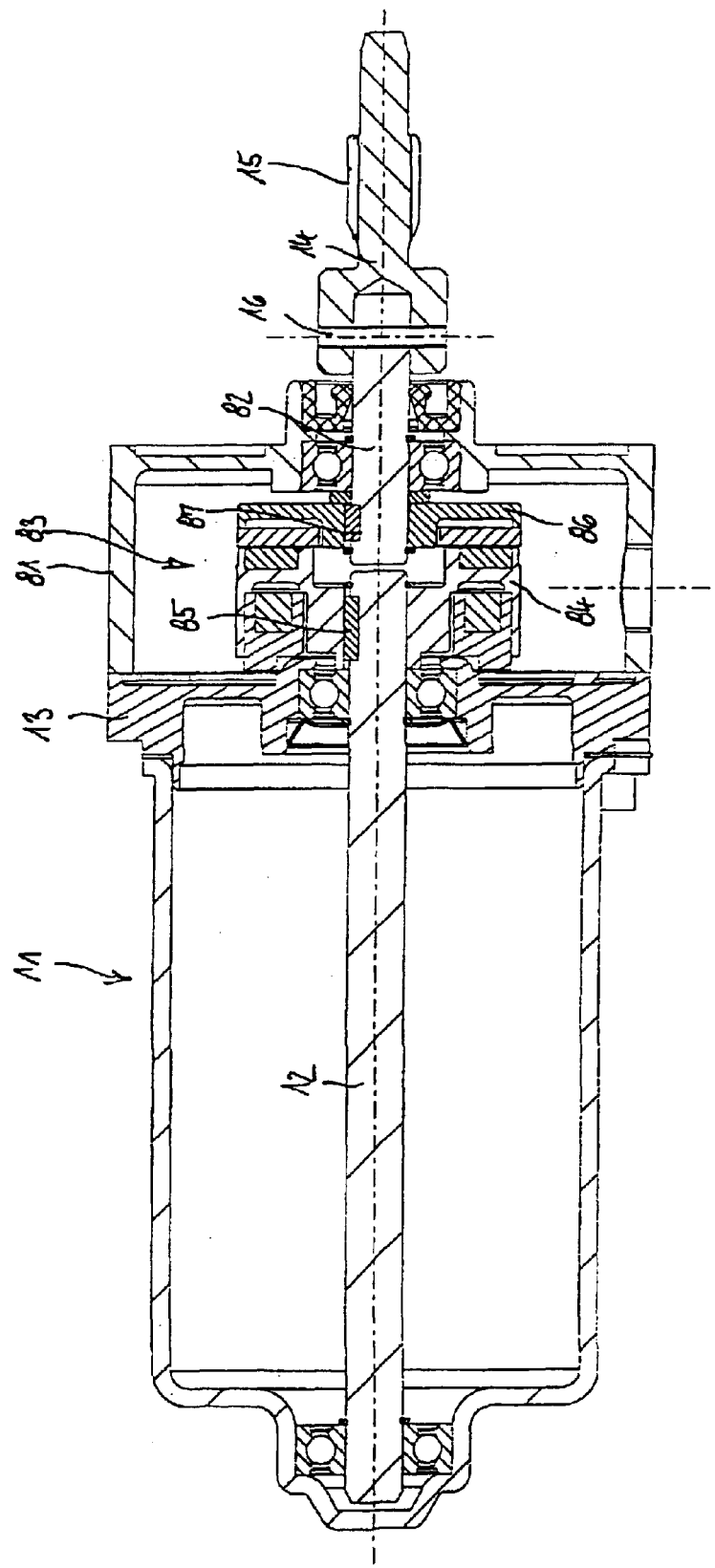
FIG. 2 shows the driving motor with the switching coupling according to FIG. 1 in the form of a detail.

FIGS. 1 and 2 will be described jointly below. They show a first axial setting device in accordance with an embodiment of the invention in a mounted condition. A driving motor 11 is shown as provided with a motor shaft 12 and with a motor housing 13 in which the motor shaft 12 is supported twice. A coupling housing 81 in which there is supported a coupling shaft 82 is fixed to the motor housing 13. A first plate 84 of an electro-magnetic switching coupling 83 is secured to the motor shaft 12 by way of a feather key 85. A second plate 86 of the electro-magnetic switching coupling 83 is secured to the coupling shaft 82 by way of a feather key 87. On the coupling shaft 82 there is secured by way of a pin 16 a shaft journal 14 which forms a driving pinion 15. The coupling housing 81 is inserted into a centering bore 51 in a housing wall 52. The free end of the shaft journal 14 is supported by a needle bearing 21 in a housing wall 54. A bearing journal 18 is inserted into a further bore 53 in the housing wall 52. On the bearing journal 18, there is rotatably supported a sleeve pinion 19 by way of two needle bearings 41, 42. A larger gearwheel 20 which, by way of its gear rim, engages the pinion 15 is pressed on to the sleeve pinion 19. The sleeve pinion 19, in turn, engages a tooth segment 22 which is firmly connected to a first plate 24 of the setting device. By way of a needle bearing 23, the plate 24 is rotatably supported on a projection of a cover 25 on which it is axially supported by way of an axial bearing 26, a plate 27 and a securing ring 28. The plate 24 cooperates with a further plate 29 which is slidingly supported on a projection of the plate 24 and which is supported on the cover 25 by way of an axial bearing 30 and a plate 31 via pressure springs 33. The plate 31 acts on pressure pins 32 inserted into the pressure springs 33. The pressure pins 32 form the direct setting members of the device. The surfaces of the plates 24, 29, which face one another, are provided with pairs of grooves 34, 39 whose depth varies across the circumference and in which there run balls 35 held in a ball cage 36. The plate 29 comprises a radial projection 37 with a guiding claw 38. The guiding claw 38 slides in a longitudinally displaceable way on a holding pin 40 which is firmly inserted into a bore 55 in a housing wall 56 and which, in this way, holds the axially displaceable plate 29 in a rotationally fast way.

Figure 3:
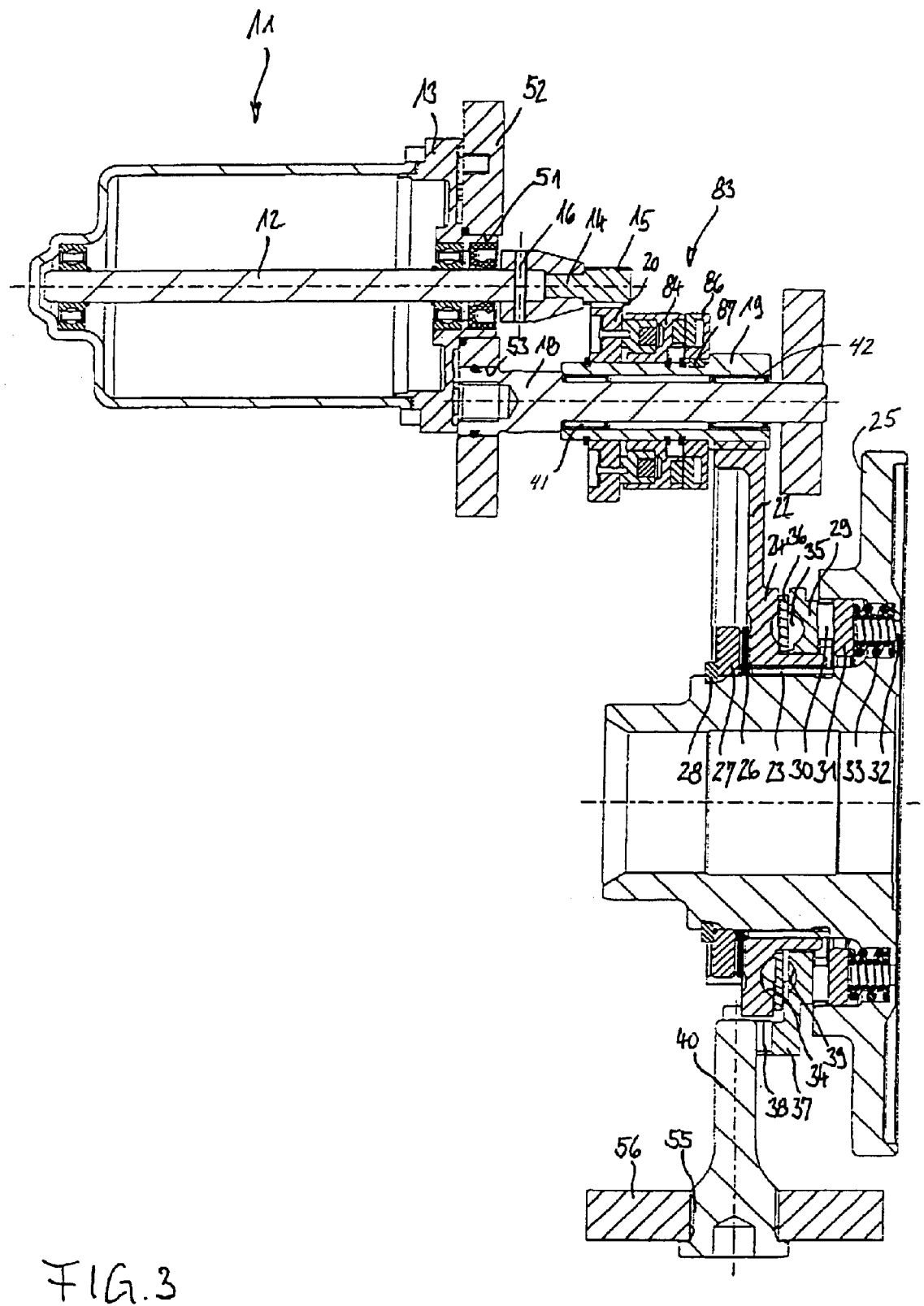
FIG. 3 shows the inventive device in a second embodiment with a switching coupling on an intermediate shaft.
Figure 4:
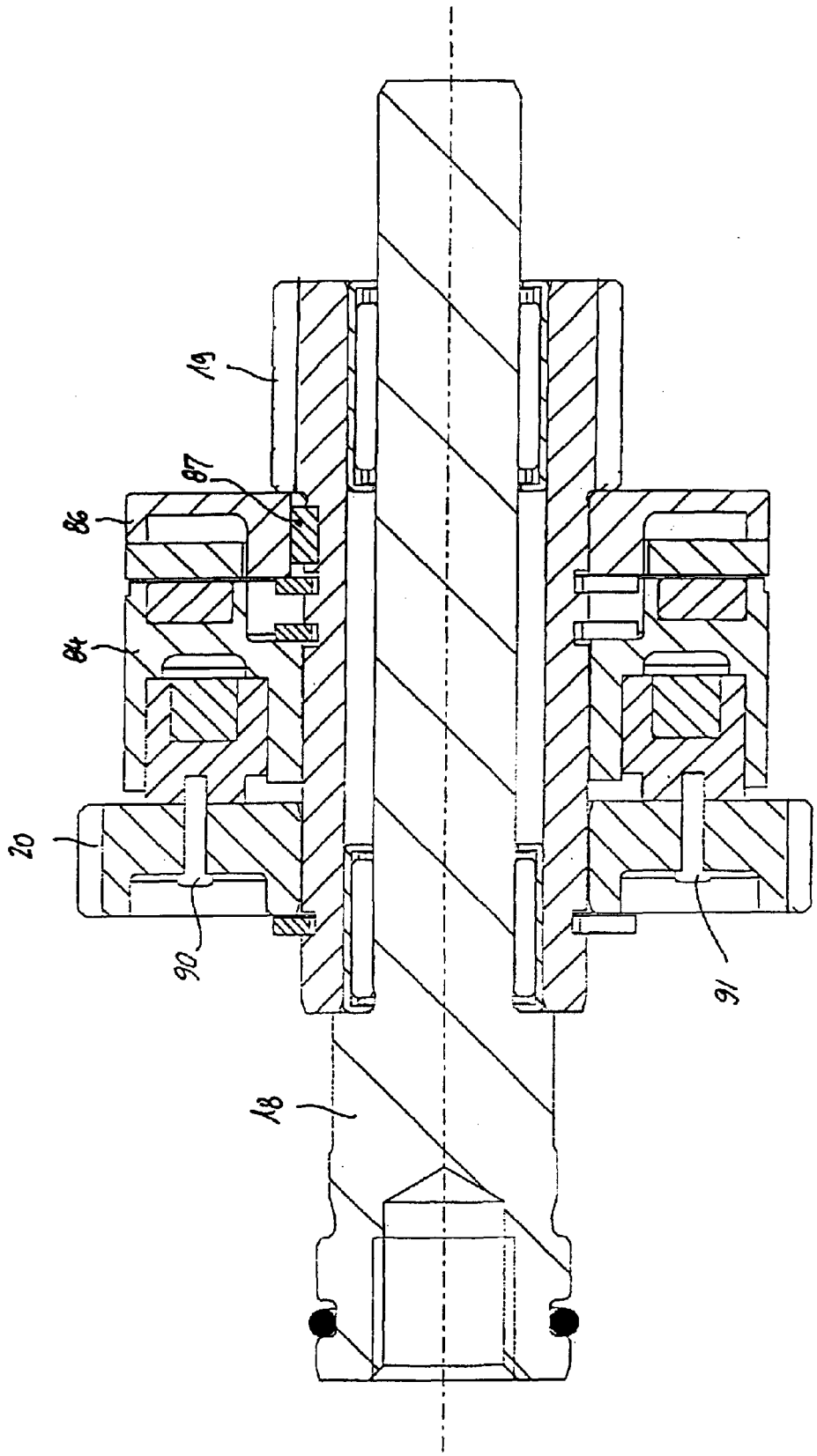
FIG. 4 shows the switching coupling on the intermediate shaft in the form of a detail.

FIGS. 3 and 4 will be described jointly below. They show a second embodiment of an axial setting device in accordance with the invention in a mounted condition. A driving motor 11 is shown to be provided with a motor shaft 12 and with a motor housing 13 in which the motor shaft 12 is supported twice. The motor housing 13 is inserted into a centering bore 51 in a housing wall 52. On the motor shaft 12, there is secured by way of a pin 16, a shaft journal 14 which forms a driving pinion 15. A bearing journal 18 is inserted into a further bore 53 in the housing wall 52. A sleeve pinion 19 is rotatably supported on the bearing journal 18 by way of two needle bearings 41, 42. A larger gearwheel 20 is rotatably supported on the sleeve pinion 19. Furthermore, an electro-magnetic switching coupling 83 is positioned on the sleeve pinion 19. A first plate 84 of an electro-magnetic switching coupling 83 is secured by pins 90, 91 on the gearwheel 20, with a second plate 86 of the electro-magnetic switching coupling 83 being secured by a feather key 87 on the sleeve pinion 19. The gearwheel 20, by way of its gear rim, engages the pinion 15. The sleeve pinion 19, in turn, engages the tooth segment 22 which is firmly connected to a first plate 24 of the setting device. By way of a needle bearing 23, the plate 24 is rotatably supported on a projection of a cover 25 on which it is axially supported by way of an axial bearing 26, a plate 27 and a securing ring 28. The plate 24 cooperates with a further plate 29 which is slidingly supported on a projection of the plate 24 and which, by way of an axial bearing 30 and a disc 31, is supported via pressure springs 33 on the cover 25. The plate 31 acts on pressure pins 32 which are positioned in the pressure springs 33. The pressure pins 32 form the direct setting members of the device. The surfaces of the plates 24, 29, which face one another, are provided with pairs of grooves 34, 39 whose depth varies across the circumference and in which there run balls 35 held in a ball cage 36. The plate 29 comprises a radial projection 37 with a guiding claw 38. The guiding claw 38 slides in a longitudinally displaceable way on a holding pin 40 which is firmly inserted into a bore 55 in a housing wall 56 and which, in this way, holds the axially displaceable plate 29 in a rotationally fast way.

Figure 5:
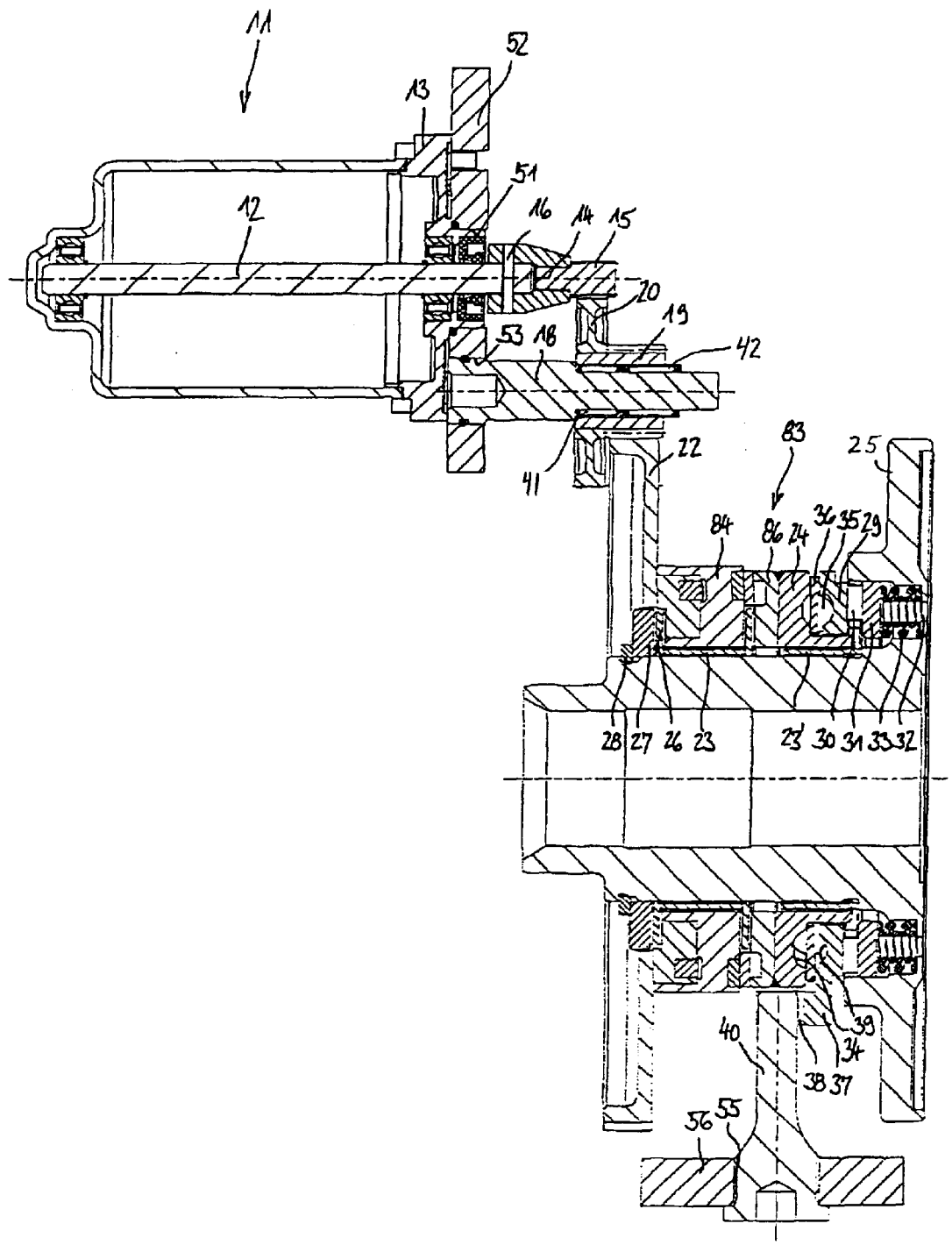
FIG. 5 shows an inventive device in a third embodiment with a switching coupling arranged in the drive of the first ramp plate.
Figure 6:
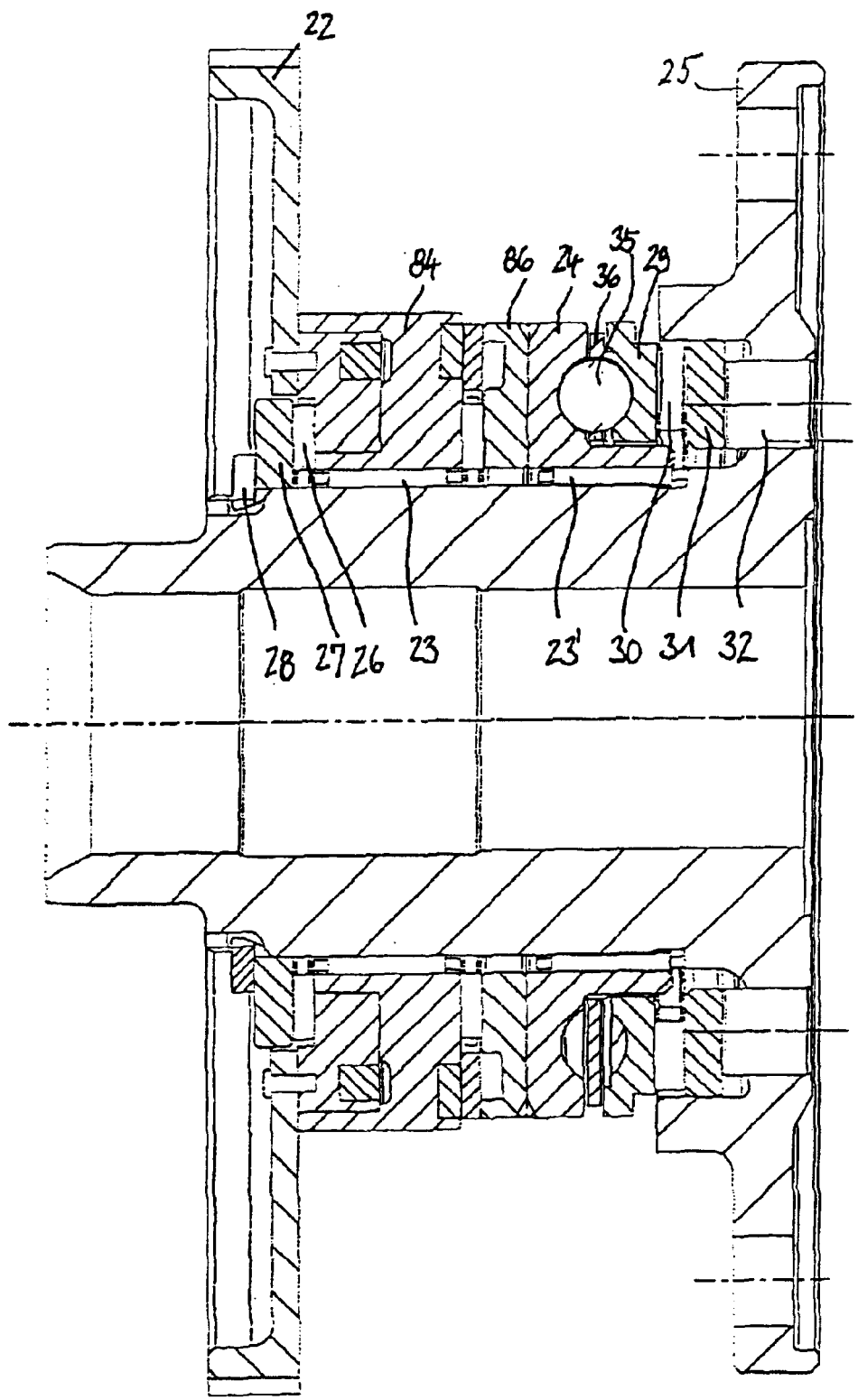
FIG. 6 shows the drive of the first ramp plate in the form of an enlarged detail.

FIGS. 5 and 6 will be described jointly below. They show a third embodiment of an axial setting device in accordance with the invention in a mounted condition. A driving motor 11 is shown to be provided with a motor shaft 12 and with a motor housing 13 in which the motor shaft 12 is supported twice. The motor housing 13 is inserted into a centering bore 51 in a housing wall 52. On the motor shaft 12 there is secured by way of a pin 16 a shaft journal 14 which forms a driving pinion 15. A bearing journal 18 is inserted into a further bore 53 in the housing wall 52. A sleeve pinion 19 is rotatably supported on the bearing journal 18 by way of two needle bearings 41, 42. A larger gearwheel 20 is pressed on to the sleeve pinion 19 and, by way of its rim gear, engages the pinion 15. The sleeve pinion 19, in turn, engages a gearwheel 22 which, via a switching coupling 83, can be connected to a first plate 24 of the setting device. A first plate 84 of the electro-magnetic switching coupling 83 is firmly connected to the gearwheel 22, and a second plate 86 of the electro-magnetic switching coupling 83 is welded to the first plate 24 of the setting device. The first plate 84 of the switching coupling and the plate 24 are rotatably supported via a needle bearing 23, 23' each on a projection of a cover 25 on which they are axially supported by way of an axial bearing 26, a plate 27 and a securing ring 28. The plate 24 cooperates with a further plate 29 which is slidingly supported on a projection of the plate 24 and which, by way of an axial bearing 30 and a disc 31, is supported via pressure springs 33 on the cover 25. The plate 31 acts on pressure pins 32 which are positioned in the pressure springs 33. The pressure pins 32 form the direct setting members of the device. The surfaces of the plates 24, 29, which face one another, are provided with pairs of grooves 34, 39 whose depth varies across the circumference and in which there run balls 35 held in a ball cage 36. The plate 29 comprises a radial projection 37 with a guiding claw 38. The guiding claw 38 slides in a longitudinally displaceable way on a holding pin 40 which is firmly inserted into a bore 55 in a housing wall 56 and which, in this way, holds the axially displaceable plate 29 in a rotationally fast way.

The following applies to all three embodiments:

When the driving motor 11 is driven for the purpose of positively setting the device, the electric switching coupling 83 is energised and thus closed. Driving the driving motor 11 thus causes the plate 24 to rotate, with the balls 35 moving from deeper ball groove regions to flatter ball groove regions in both plates, the result being that the second plate 29 is axially displaced on the projection of the plate 24 against the returning force of the springs 33. The cover 25 normally forms part of the clutch carrier of a locking clutch, such as a locking clutch for locking a differential drive. According to first variant for returning the device, the driving motor 11 is driven in the opposite direction of rotation, so that the plate 24 is rotated in such a way that the balls move from the flatter ball groove regions into the deeper ball groove regions. The plate 29 follows axially under the influence of the pressure springs 33 until the balls reach the end stops in the ball grooves which, at the same time, form the deepest ball groove regions. The abrupt braking of the plate 24 and thus of the gearwheel 20, which happens as a result, can therefore be prevented from affecting the driving motor 11, as the electric switching coupling is opened at the same time, so that the rotor mass which constitutes the largest percentage of mass can continue to rotate freely. According to a further variant for returning the device, the electric switching coupling 83 is opened at the very start, in which case the plate 29 is returned entirely under the influence of the pressure springs 33, which plate 29 then forces the plate 24 to rotate in the opposite direction of rotation in that the balls run from the flatter ball groove regions into the deeper ball groove regions. When the balls reach the end stops in the ball grooves which, at the same time, form the deepest ball groove regions, the rotor mass of the electric motor 11 has already been disconnected from the rotational masses of the setting device. The driving motor is normally a frequency-modulated electric motor but other types of electric motors are also contemplated by the present invention. In the first embodiment, the rotor mass, during the return movement, continues to rotate freely. In the second embodiment, the motor mass includes the gearwheels 15, 20 and in the third embodiment, it additionally includes the mass of the gearwheel 22.

From the foregoing, it can be seen that there has been brought to the art a new and improved axial setting device and switch coupling. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An axial setting device comprising:
   two plates which are relatively rotatable and coaxially supported relative to one another and between which balls are guided in pairs of ball grooves in the plates, with the depth of said pairs of ball grooves being circumferentially variable, one of the plates being axially supported and one of the plates being axially displaceable against elastic returning forces of a spring mechanism, and at least one of the plates being drivable via a driveline by a driving motor; and
   a switching coupling within a driveline between the driving motor and the drivable one of the plates.

2. A device according to claim 1, wherein the switching coupling is incorporated between a motor shaft of the driving motor and a coupling shaft.

3. A device according to claim 1, wherein the switching coupling is effectively inserted between two gears of an intermediate shaft of the driveline, wherein one of the gears is connected to the intermediate shaft in a rotationally fixed way, and the other of the gears is rotatably supported on the intermediate shaft.

4. A device according to claim 1, wherein the switching coupling is inserted between the drivable one of the plates and a gear or tooth segment for driving the drivable one of the plates.

5. A device according to claim 2 comprising a coupling housing supporting the coupling shaft, the coupling housing being secured to a motor housing containing the drive motor.

6. A device according to claim 2 wherein the switching coupling comprises a first plate secured to the motor shaft and a second plate secured to the coupling shaft.

7. A device according to claim 6 wherein the first and second plates of the switching coupling are secured to the respective motor shaft and coupling shaft by feather keys.

8. A device according to claim 1 wherein the switching coupling comprises an electro-magnetic switching coupling.

9. A device according to claim 3 wherein the switching coupling comprises a first plate secured to the rotationally fixed gear of the intermediate shaft and second plate secured to the rotatably supported gear of the intermediate shaft.

10. A device according to claim 9 wherein the first plate of the switching coupling is secured to the rotationally fixed gear of the intermediate shaft by pins.

11. A device according to claim 9 wherein the second plate of the switching coupling is secured to the rotatably supported gear of the intermediate shaft by a feather key.

12. A device according to claim 4 wherein the switching coupling comprises a first plate secured to the gear or tooth segment for driving the driveable one of the plates, and a second plate secured to the driveable one of the plates.

* * * * *